United States Patent
Mizukami

(10) Patent No.: US 12,334,790 B2
(45) Date of Patent: Jun. 17, 2025

(54) MOTOR AND AIRCRAFT

(71) Applicant: Nidec Corporation, Kyoto (JP)

(72) Inventor: Junya Mizukami, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 203 days.

(21) Appl. No.: 18/104,920

(22) Filed: Feb. 2, 2023

(65) Prior Publication Data

US 2023/0253852 A1    Aug. 10, 2023

(30) Foreign Application Priority Data

Feb. 4, 2022 (JP) ................. 2022-016475

(51) Int. Cl.
*H02K 3/52* (2006.01)
*B64D 27/24* (2006.01)

(52) U.S. Cl.
CPC ............ *H02K 3/522* (2013.01); *B64D 27/24* (2013.01); *H02K 2203/06* (2013.01)

(58) Field of Classification Search
CPC ........ B64D 27/24; H02K 1/146; H02K 11/33; H02K 21/22; H02K 2203/06; H02K 3/18; H02K 3/522
See application file for complete search history.

(56) References Cited

U.S. PATENT DOCUMENTS

| | | | | |
|---|---|---|---|---|
| 1,747,334 A | * | 2/1930 | Sundstedt | B64D 27/00 114/274 |
| 2008/0048513 A1 | * | 2/2008 | Wilsdorf | H02K 31/00 310/156.41 |
| 2010/0038473 A1 | * | 2/2010 | Schneider | F16F 15/134 184/6.12 |
| 2012/0025661 A1 | * | 2/2012 | Sakane | H02K 3/522 310/215 |
| 2014/0028143 A1 | * | 1/2014 | Ishigami | H02K 3/18 310/208 |
| 2017/0257001 A1 | * | 9/2017 | Kamiya | H02K 3/12 |

FOREIGN PATENT DOCUMENTS

JP    2020-145853 A    9/2020

* cited by examiner

*Primary Examiner* — Naishadh N Desai
(74) *Attorney, Agent, or Firm* — Keating & Bennett, LLP

(57) ABSTRACT

A motor includes a rotor and a stator including a stator core including a core back and teeth, and a coil including a conductor including a wound portion wound around the teeth and an end extending from the wound portion. An axial position of the end is within a range from an end on one side to an end on the other side in an axial direction of the wound portion.

15 Claims, 10 Drawing Sheets

MOTOR AND AIRCRAFT

CROSS-REFERENCE TO RELATED APPLICATIONS

The present application claims priority under 35 U.S.C. § 119 to Japanese Patent Application No. 2022-016475, filed on Feb. 4, 2022, the entire contents of which are hereby incorporated herein by reference.

1. FIELD OF THE INVENTION

The present disclosure relates to a motor and an aircraft.

2. BACKGROUND

A conventional motor includes a stator. The stator includes a coil arranged on a stator core. The coil is formed by winding a conductive wire around the stator core.

Conventionally, an end of a portion of the conductive wire wound around the stator core is drawn out in an axial direction parallel to a central axis of the motor. This increases the axial width of the coil. As a result, it is necessary to increase the size of the motor.

SUMMARY

A motor according to an example embodiment of the present disclosure includes a rotor that is rotatable about a central axis, and a stator radially opposite to the rotor. The stator includes a stator core including an annular core back centered on the central axis and teeth extending radially from the core back, and a coil on at least a portion of the stator core. The coil includes a conductor including an annular wound portion wound around the teeth and an end extending from the wound portion. An axial position of the end is within a range from an end on one side to an end on the other side in an axial direction of the wound portion.

An aircraft according to an example embodiment of the present disclosure includes the motor according to the above-described example embodiment, and a propeller that is rotatable by a driving force of the motor.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described below with reference to the drawings.

In the present description, a direction in which a central axis CA of the motor 100 extends is simply defined as an "axial (direction)", one side in the axial direction is defined as an upper side, and the other side in the axial direction is defined as a lower side. However, this definition of upper and lower does not limit the orientation and positional relationship when the motor 100 is used.

In the present description, a radial direction centered on the central axis CA is simply called a "radial (direction)", a direction approaching the central axis CA in the radial direction is simply called a "radially inward", and a direction away from the central axis CA is simply called a "radially outward". A circumferential direction centered on the central axis CA is simply called a "circumferential (direction)".

Figure 1:
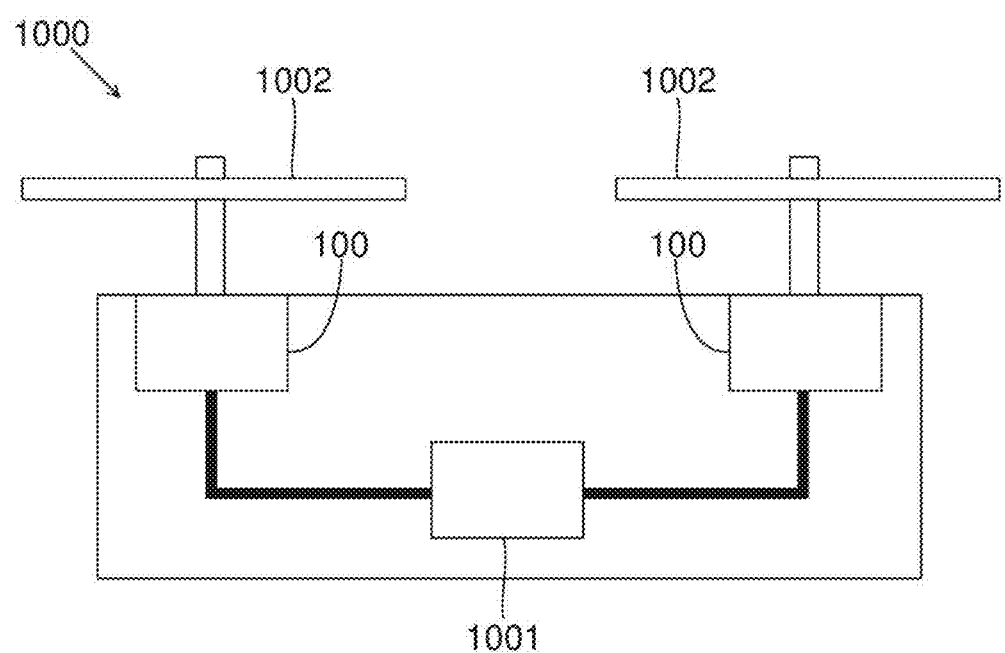
FIG. 1 is a schematic view of an aircraft according to an example embodiment of the present invention.

FIG. 1 is a schematic diagram of an aircraft 1000 according to the present example embodiment.

The aircraft 1000 according to the present example embodiment includes a motor 100. The aircraft 1000 uses the motor 100 as a drive source. The motor 100 receives power supply from a battery 1001. The aircraft 1000 also includes a propeller 1002. The propeller 1002 rotates by the driving force of the motor 100.

The application of the motor 100 is not particularly limited. The motor 100 needs not be used as a drive source for the aircraft 1000.

Figure 2:
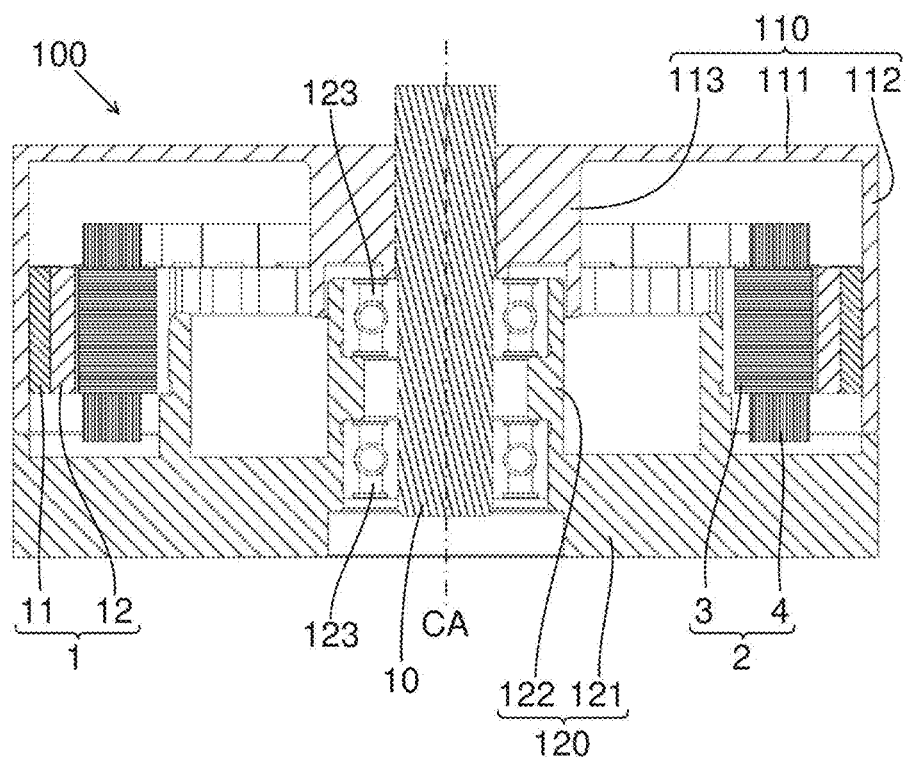
FIG. 2 is a cross-sectional view of a motor according to an example embodiment of the present invention.
Figure 3:
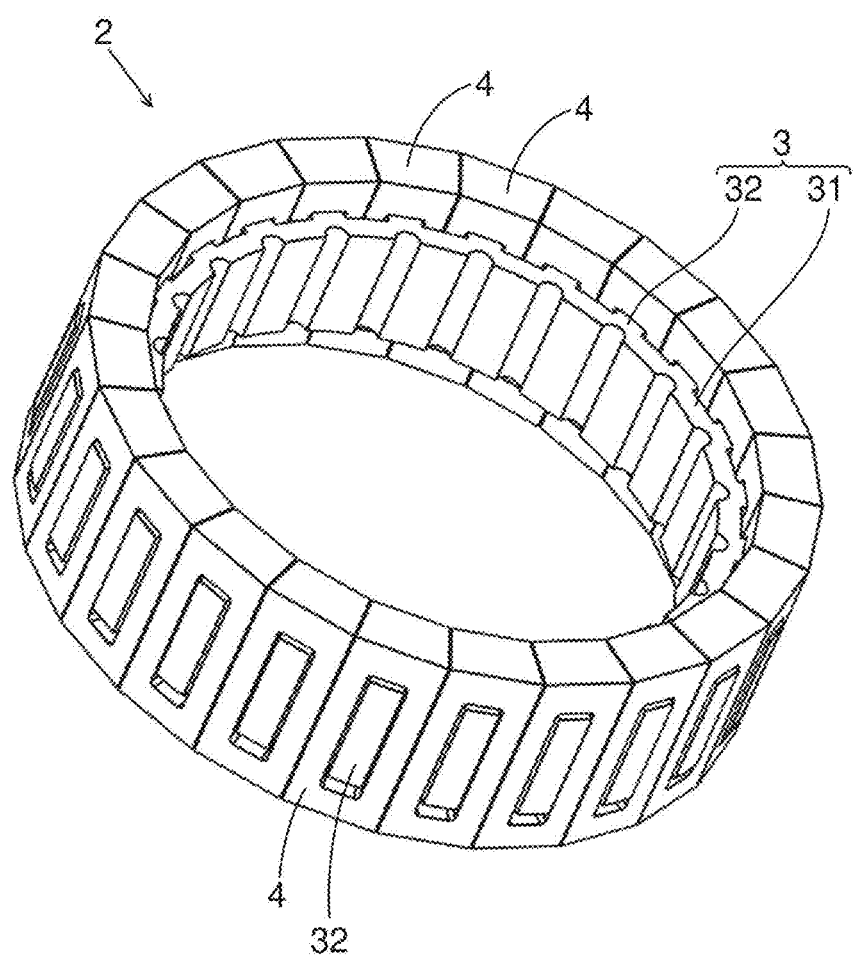
FIG. 3 is a perspective view of a stator according to an example embodiment of the present invention.
Figure 4:
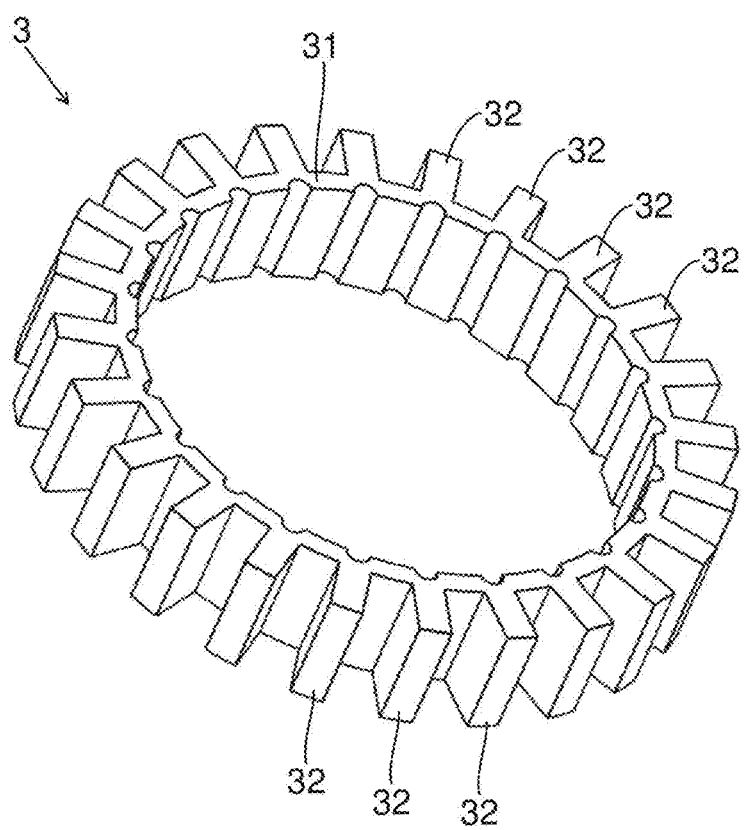
FIG. 4 is a perspective view of a stator core according to an example embodiment of the present invention.
Figure 5:
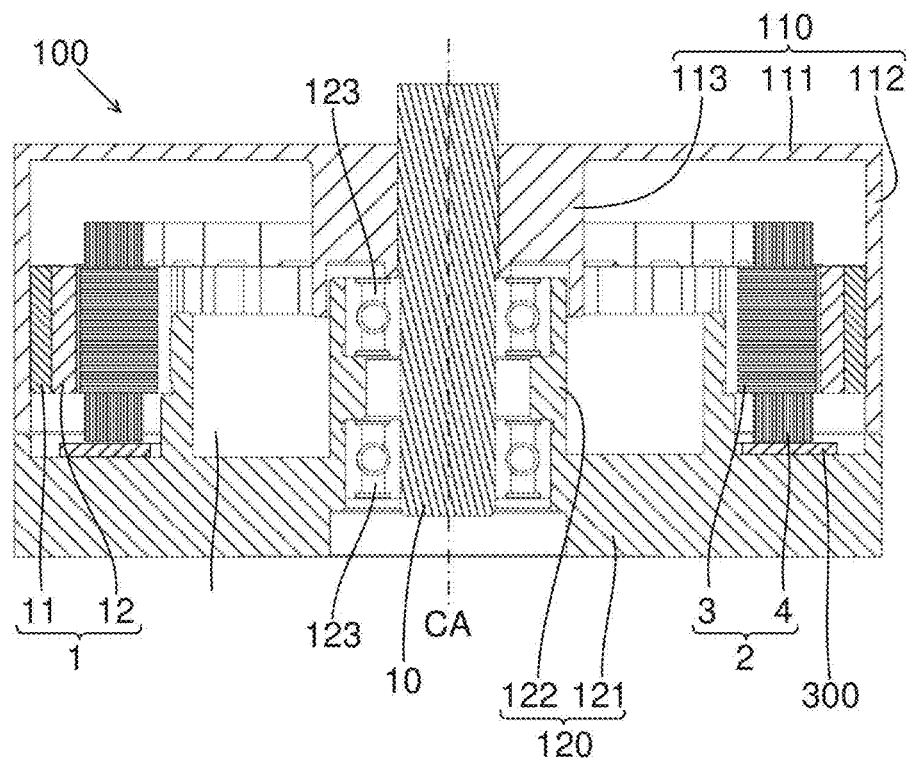
FIG. 5 is a cross-sectional view of a motor according to a modification of an example embodiment of the present invention.

FIG. 2 is a cross-sectional view of the motor 100 according to the present example embodiment. FIG. 3 is a perspective view of a stator 2 according to the present example embodiment. FIG. 4 is a perspective view of a stator core 3 according to the present example embodiment. FIG. 5 is a cross-sectional view of the motor 100 according to a modification.

In the present example embodiment (see FIGS. 2 to 4), the motor 100 includes a rotor 1 and the stator 2. The motor 100 includes a shaft 10. The shaft 10 is arranged along the central axis CA extending up-down. The shaft 10 is held so as to be rotatable about the central axis CA. The rotor 1 rotates about the central axis CA. The stator 2 is arranged to radially oppose the rotor 1. The stator 2 rotates the rotor 1.

The rotor 1 includes a rotor core 11 and a magnet 12. The rotor core 11 has a cylindrical shape extending in the axial direction. The rotor core 11 is a laminated body in which a plurality of electromagnetic steel sheets are laminated in the axial direction. The magnet 12 is fixed to the radially inner surface of the rotor core 11. The magnet 12 is an annular permanent magnet. The magnet 12 has N poles and S poles alternately in the circumferential direction. The magnet 12 may have a configuration in which a plurality of magnet pieces are arrayed in the circumferential direction and the plurality of magnet pieces are fixed to the radially inner surface of the rotor core 11.

The rotor 1 is fixed to a rotating member 110. The rotating member 110 has, for example, a covered tubular shape. That is, the rotating member 110 includes an upper surface part 111 and a tubular part 112. The upper surface part 111 has a disk shape centered on the central axis CA. The upper surface part 111 has a shaft fixing part 113 extending downward in a tubular shape along the central axis CA.

The shaft 10 is arranged radially inward of the shaft fixing part 113. The radially outer surface of the shaft 10 is fixed to the radially inner surface of the shaft fixing part 113. Due to this, the shaft 10 and the rotating member 110 rotate together.

The tubular part 112 has a tubular shape and extends downward from a radially outer end of the upper surface part 111. The rotor 1 is arranged radially inward of the tubular part 112. Specifically, the radially outer surface of the rotor core 11 is fixed to the radially inner surface of the tubular part 112. Due to this, the rotating member 110 rotates together with the rotor 1.

The propeller 1002 (see FIG. 1) is fixed to the rotating member 110. For example, the rotating member 110 has a propeller holding portion (not illustrated) on the upper surface part 111. The propeller 1002 is fastened to the propeller holding portion of the upper surface part 111 via a fastening member.

The stator 2 includes the stator core 3. The stator core 3 is an annular body centered on the central axis CA extending up-down, and is a laminated body in which a plurality of electromagnetic steel sheets are laminated in the axial direction. The stator 2 is arranged radially inward of the rotor 1. That is, the stator core 3 is arranged radially inward of the rotor 1 and radially opposes the magnet 12.

The stator core 3 includes a core back 31. The core back 31 has an annular shape centered on the central axis CA. The core back 31 is formed in an annular shape when viewed from the axial direction. The stator core 3 includes teeth 32. The teeth 32 extend in the radial direction from the core back 31. Specifically, the number of teeth 32 is plural. Each of the plurality of teeth 32 extends radially outward from the core back 31 and is arranged at intervals in the circumferential direction.

The stator 2 is held by the stator holder 120. The stator holder 120 includes a base part 121. The base part 121 has a disk shape centered on the central axis CA. The base part 121 constitutes a bottom surface portion of the motor 100.

The stator holder 120 includes a bearing holding portion 122. The bearing holding portion 122 extends in a tubular shape upward along the central axis CA. The shaft 10 is arranged radially inward of the bearing holding portion 122. A bearing 123 is arranged radially inward of the bearing holding portion 122. The radially outer surface of the bearing 123 is fixed to the radially inner surface of the bearing holding portion 122. The bearing 123 rotatably holds the shaft 10.

As a modification, although not illustrated, the rotating member 110 may rotate with respect to the shaft 10. For example, the shaft 10 is fixed to the stator holder 120, and an outer ring of the bearing 123 is fixed to the shaft fixing part 113.

The stator 2 includes a coil 4. The coil 4 is arranged on at least a part of the stator core 3. Specifically, the coil 4 includes a conductor 40 described below. At least a part of the stator core 3 is covered with an insulator (not illustrated). The insulator is an insulating member using resin or the like. The coil 4 is formed by winding the conductor 40 around the stator core 3 with the insulator interposed. FIG. 3 schematically illustrates the coil 4.

In the modification (see FIG. 5), the motor 100 includes a substrate 300 connected to the stator 2. In other words, the stator 2 has the substrate 300. The substrate 300 is connected to the coil 4. The substrate 300 is mounted with an electronic component that controls power supply to the coil 4.

The shape of the substrate 300 is not particularly limited. For example, the substrate 300 is formed in an annular shape centered on the central axis CA. The substrate 300 is arranged below the stator 2. In other words, the substrate 300 is arranged at an interval in the axial direction from the lower end of the coil 4. Although not illustrated, the substrate 300 may be arranged above the stator 2. In this case, the substrate 300 is arranged at an interval in the axial direction from the upper end of the coil 4.

In the example embodiment illustrated in FIG. 2, a substrate corresponding to the substrate 300 of the modification is arranged outside the motor 100. The substrate of the example embodiment may be arranged below the stator holder 120.

Figure 6:
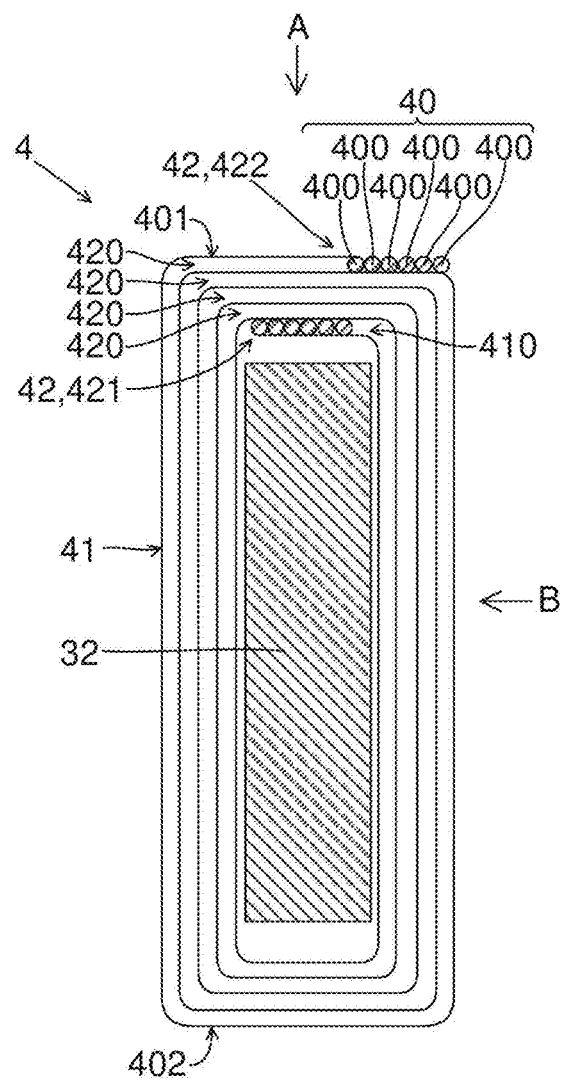
FIG. 6 is a schematic view of a coil according to an example embodiment of the present invention as viewed from radially inward.
Figure 7:
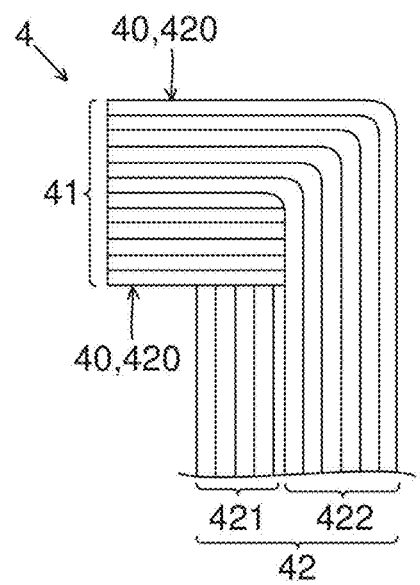
FIG. 7 is a view of the coil illustrated in FIG. 6 as viewed from a direction of arrow A.
Figure 8:
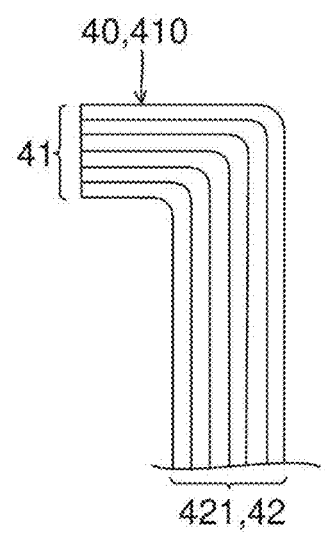
FIG. 8 is a view in which an upper layer portion is omitted from the coil illustrated in FIG. 7.
Figure 9:
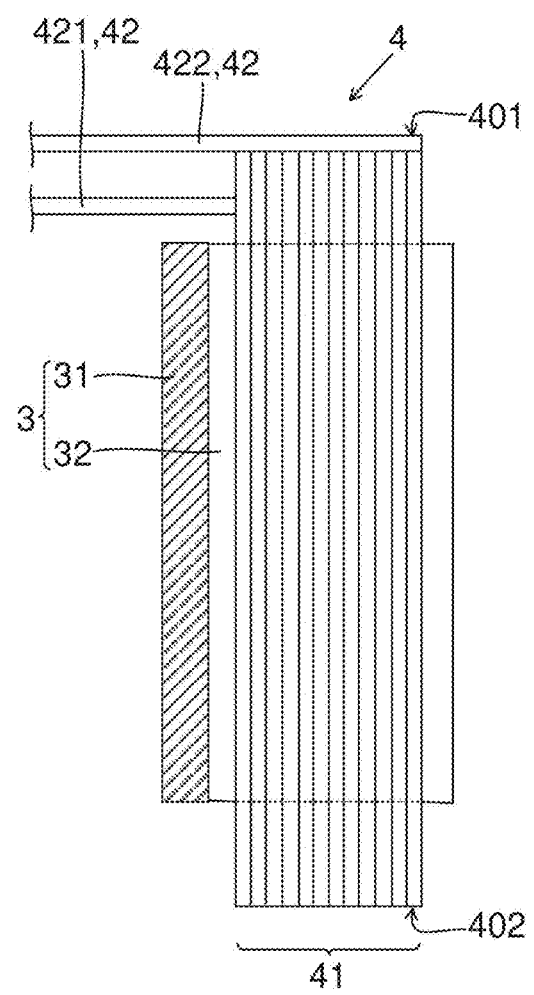
FIG. 9 is a view of the coil illustrated in FIG. 6 as viewed from a direction of arrow B.
Figure 10:
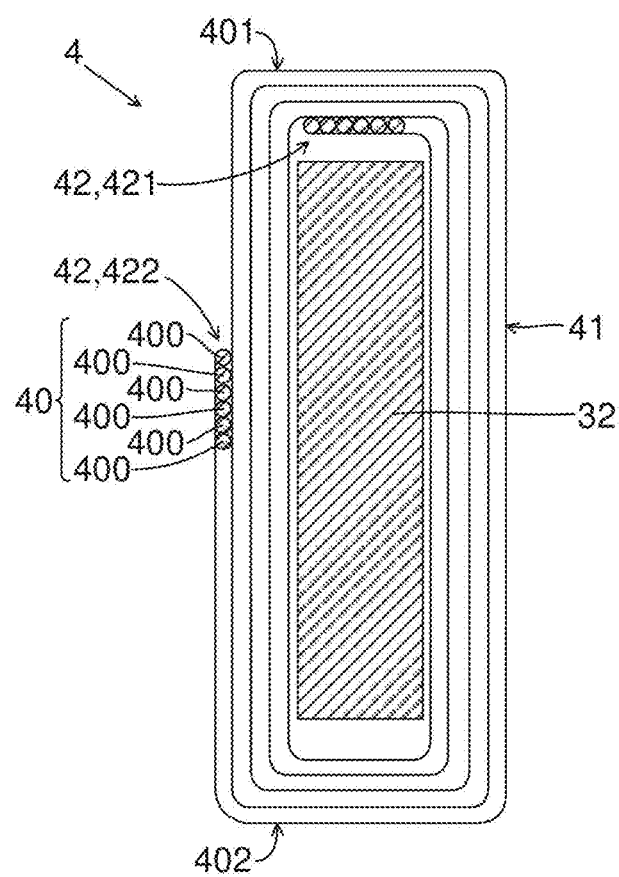
FIG. 10 is a schematic view of a coil according to a modification of an example embodiment of the present invention as viewed from radially inward.

FIG. 6 is a schematic view of the coil 4 according to the present example embodiment as viewed from radially inward. FIG. 6 illustrates the teeth 32, thereby making it clear the positional relationship between the coil 4 and the teeth 32. FIG. 7 is a view of the coil 4 illustrated in FIG. 6 as viewed from the direction of arrow A (upward). FIG. 8 is a view in which an upper layer portion 420 is omitted from the coil 4 illustrated in FIG. 7. FIG. 9 is a view of the coil 4 illustrated in FIG. 6 as viewed from a direction of arrow B (circumferential direction). FIG. 10 is a schematic view of a coil according to a modification as viewed radially inward.

The coil 4 includes the conductor 40. The conductor 40 is arranged on the teeth 32. That is, the coil 4 includes the conductor 40 arranged on the teeth 32. Here, the conductor 40 is arranged on each of the plurality of teeth 32. The conductor 40 arranged on each of the teeth 32 serves as the coil 4. Due to this, the plurality of coils 4 is arranged in the stator core 3. That is, the stator 2 includes the plurality of coils 4. The plurality of coils 4 are arranged in the circumferential direction.

For example, when the stator 2 is manufactured, the air-cored coil 4 is separately formed. The process of forming the coil 4 and arranging the coil 4 on the stator core 3 can be classified into, for example, first to third processes. First process: The conductor 40 is wound around a core material (not illustrated) to form the annular coil 4. Second process: The coil 4 is removed from the core material to form the air-cored coil 4. Third process: The air-cored coil 4 is inserted into the teeth 32. Due to this, the conductor 40 is wound around the teeth 32. This gives the stator 2 in which the coil 4 is arranged in the stator core 3.

The stator 2 includes the coil 4 of a plurality of phases. The number of phases is not particularly limited. For example, the coil 4 of the plurality of phases is classified into three, i.e., a U-phase coil 4, a V-phase coil 4, and a W-phase coil 4. The stator 2 has two or more coils 4 of each phase. The number of coils 4 of each phase is the same.

The conductor 40 is a conductive wire 400. The constituent material of the conductive wire 400 is copper, for example. However, the present disclosure is not limited to this. The constituent material of the conductive wire 400 may be aluminum or another material. When the constituent material of the conductive wire 400 is aluminum, the weight of the coil 4 including the conductor 40 can be reduced in weight as compared with a case of copper. That is, the weight of the motor 100 can be reduced.

Here, the conductor 40 includes a plurality of conductive wires 400. Due to this, in the process of forming the coil 4, the number of the conductive wires 400 to be wound as the coil 4 can be easily increased. Tip ends of the plurality of conductive wires 400 constituting the conductor 40 are connected to a substrate (not illustrated) for each phase. The conductor 40 may be formed by winding one conductive wire 400. That is, the conductor 40 may be a single wire.

The conductor 40 is a member in which a plurality of conductive wires 400 are arrayed in parallel to one another in one direction. In other words, the conductor 40 is a member in which the width in the one direction is larger than the diameter of the conductive wire 400 and the width (in other words, thickness of the conductor 40) in the other direction orthogonal to the one direction is the same as (including substantially the same as) the diameter of the conductive wire 400. In still other words, the conductor 40 is a flat member.

The conductor 40 includes a wound portion 41. The wound portion 41 is a portion to be annularly wound around the teeth 32. The teeth 32 have a rectangular shape (including a substantially rectangular shape) whose longitudinal direction is the axial direction when viewed from the radial direction. That is, the wound portion 41 is an annular body in which the axial direction is the longitudinal direction when viewed from the radial direction. The annular body as the wound portion 41 when viewed from the radial direction has a shape along an outer circumference of the teeth 32.

The conductor 40 has an end 42. The end 42 is a part extending from the wound portion 41. In other words, the end 42 is a part of the conductor 40 protruding from the wound portion 41. In still other words, the end 42 is a part of the conductor 40 that is not wound around the teeth 32.

A winding start part of the conductor 40 with respect to the teeth 32 protrudes from the wound portion 41. Furthermore, a winding end part of the conductor 40 with respect to the teeth 32 protrudes from the wound portion 41. The conductor 40 has, as the ends 42, the winding start part with respect to the teeth 32 and the winding end part with respect to the teeth 32.

In the ends 42, the winding start part with respect to the teeth 32 corresponds to a "start end", and the winding end part with respect to the teeth 32 corresponds to a "terminal end". In the following description, in a case where it is necessary to distinguish the winding start and the winding end of the end 42, the winding start part with respect to the teeth 32 is given reference numeral 421 and called a start end 421, and the winding end part with respect to the teeth 32 is given reference numeral 422 and is called a terminal end 422. That is, the end 42 includes the start end 421 and the terminal end 422.

In the process of forming the coil 4, the conductor 40 is wound in a layer form from the core material side toward the opposite side. In other words, the conductor 40 is wound many times from the core material side toward the opposite side. Therefore, in a state where the wound portion 41 is wound around the teeth 32, the conductors 40 overlap in layers from the teeth 32 side toward the opposite side.

That is, the wound portion 41 includes a lowermost layer portion 410 arranged at the lowermost layer closest to the teeth 32 and the upper layer portion 420 arranged on the lowermost layer portion 410. In other words, the wound portion 41 includes the conductor 40 wound twice or more with respect to the teeth 32. In still other words, the wound portion 41 is a portion in which the conductors 40 overlap in layers in a direction orthogonal to the array direction of the plurality of conductive wires 400 constituting the conductor 40. This configuration can increase the number of windings of the coil 4. Since the conductors 40 are flat members and overlap in layers in a direction orthogonal to the array direction of the plurality of conductive wires 400 constituting the conductor 40, it is possible to suppress an increase in the axial width of the coil 4.

The lowermost layer portion 410 is the conductor 40 positioned immediately above the teeth 32 among the conductors 40 constituting the wound portion 41, and is the conductor 40 opposing the teeth 32. That is, the lowermost layer portion 410 constitutes the lowermost layer of the wound portion 41. In the process of forming the coil 4, the conductor 40 wound first as the first layer becomes the lowermost layer portion 410.

Furthermore, the wound portion 41 includes a plurality of the upper layer portions 420. The plurality of upper layer portions 420 are arranged to overlap the lowermost layer portion 410. In other words, the wound portion 41 includes the conductor 40 wound three or more times around the teeth 32. This configuration can further increase the number of windings of the coil 4.

In the conductor 40, the winding start part with respect to the core material is positioned at the lowermost layer of the wound portion 41, and the winding end part with respect to the core material is positioned at the uppermost layer of the wound portion 41. In other words, the start end 421 extends from the inner side of the wound portion 41 closest to the teeth 32, and the terminal end 422 extends from the outer side of the wound portion 41 farthest from the teeth 32. In still other words, the start end 421 extends from the lowermost layer portion 410, and the terminal end 422 extends from the upper layer portion 420 that is positioned the uppermost among the plurality of upper layer portions 420.

The end 42 is arranged between an end 401 on the upper side and an end 402 on the lower end of the wound portion 41. The end 42 extends in a direction different from the axial direction such as the radial direction and the circumferential direction without protruding upward relative to the end 401 on the upper side of the wound portion 41, and extends in a direction different from the axial direction such as the radial direction and the circumferential direction without protruding downward relative to the end 402 of the lower end of the wound portion 41. In other words, the axial position of the end 42 is within a range from the end 401 on the upper side (one side in the axial direction) to the end 402 on the lower side (the other side in the axial direction) of the wound portion 41. In still other words, the axial position of each of the start end 421 and the terminal end 422 is within the range from the end 401 on the upper side to end 402 on the lower side of the wound portion 41.

In the configuration in which the axial position of the end 42 is within the range from the end 401 on the upper side to end 402 on the lower side of the wound portion 41, it is not necessary to increase the axial width of the motor 100. As a result, it is possible to suppress an increase in the axial width of the motor 100. That is, the motor 100 can be downsized. For example, when the axial position of the end 42 is out of the range from the end 401 on the upper side to end 402 on the lower side of the wound portion 41, it is necessary to increase the axial width of the motor 100 in order to secure the wiring space of the conductor 40, and therefore the motor 100 is increased in size.

In the configuration of the modification (see FIG. 5) in which the substrate 300 is arranged below the stator 2, the conductor 40 and the substrate 300 can be suppressed from coming into contact with each other, even without the lower space of the stator 2 is not increased in the axial direction.

The start end 421 and the terminal end 422 are arranged on the same side in the axial direction with respect to the teeth 32. For example, the start end 421 and the terminal end 422 are arranged above the teeth 32. However, the present disclosure is not limited to this. The start end 421 and the terminal end 422 may be arranged below the teeth 32.

By arranging the start end 421 and the terminal end 422 on the same side in the axial direction with respect to the teeth 32, it becomes possible to easily wire the conductor 40. Since it is not necessary to secure the wiring space of a jumper wire 43 described below on both the one side and the other side in the axial direction, and it is sufficient to secure the wiring space only on one side in the axial direction, the size of the motor 100 can be easily reduced.

Here, in the present example embodiment (see FIG. 6), the terminal end 422 extends from the axial end of the wound portion 41. Specifically, the terminal end 422 extends from the end 401 on the upper side of the wound portion 41. Although not illustrated, in the configuration in which the start end 421 and the terminal end 422 are arranged below the teeth 32, the terminal end 422 extends from the end 402 on the lower side of the wound portion 41.

In the configuration in which the terminal end 422 extends from the axial end (in the example embodiment, the end 401 on the upper side of the wound portion 41) of the wound portion 41, when performing wiring work such as drawing the terminal end 422 extending from the wound portion 41 to the adjacent coil 4 in the circumferential direction, it is possible to suppress the wound portion 41 of another coil 4 adjacent in the circumferential direction from hindering the wiring work. This facilitates wiring work of the conductor 40.

In the modification (see FIG. 10), the terminal end 422 extends from the circumferential end of the wound portion 41. That is, in the modification, the terminal end 422 extends from circumferentially between a pair of the coils 4 adjacent to each other in the circumferential direction. In the modification, as compared with the example embodiment, the other coils 4 are likely to hinder the wiring work of the conductor 40. However, in the modification, the terminal end 422 needs not be arranged at the axial end, and therefore the axial width of the coil 4 can be reduced.

Figure 11:
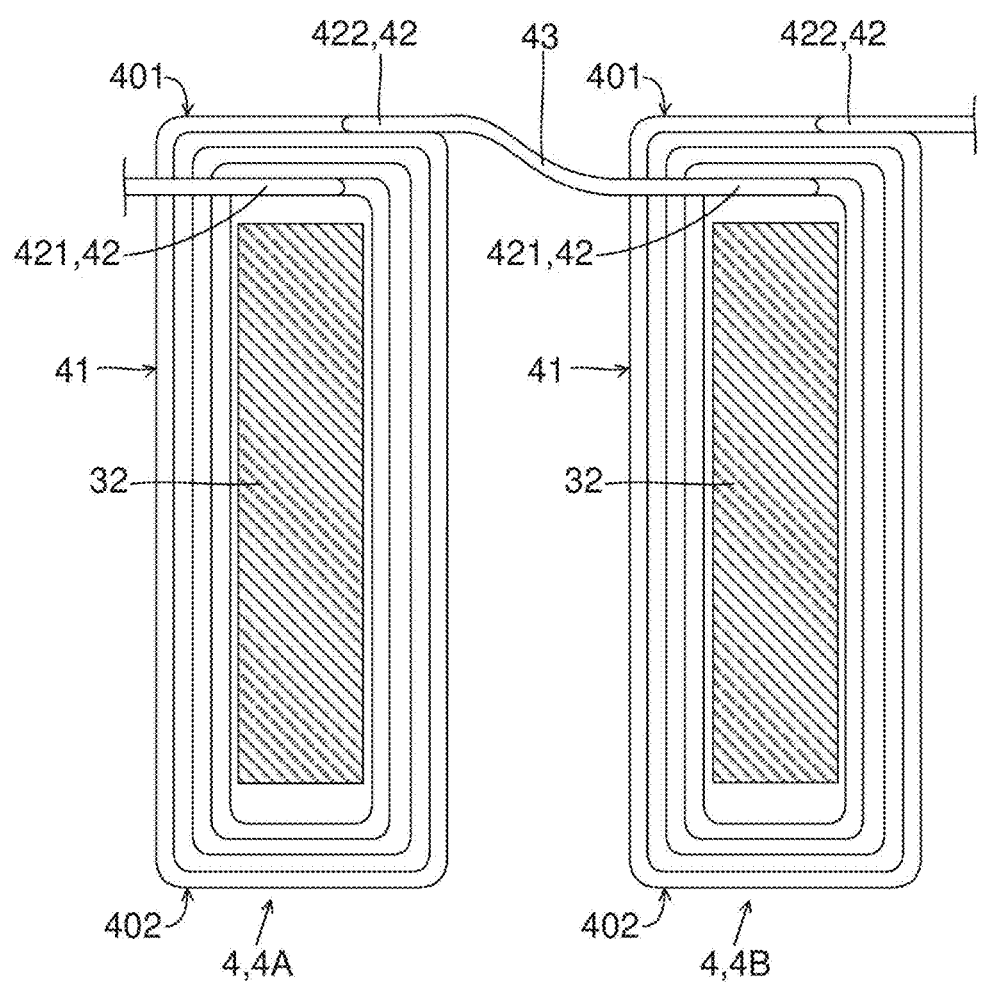
FIG. 11 is a schematic view illustrating a jumper wire according to an example embodiment of the present invention.

FIG. 11 is a schematic view illustrating the jumper wire 43 according to the example embodiment. FIG. 11 illustrates, for convenience, only the two coils 4 and the jumper wire 43 connecting them.

In the present example embodiment, a predetermined number of the coils 4 of the same phase are continuously arranged in the circumferential direction. For example, the predetermined number is two, and the two coils 4 of each phase are alternately arranged in the circumferential direction. That is, a coil group including two U-phase coils 4, a coil group including two V-phase coils 4, and a coil group including two W-phase coils 4 are alternately arranged in the circumferential direction. Therefore, the two coils 4 of the same phase are adjacent to each other in the circumferential direction.

In the following description, one coil 4 and the other coil 4 having the same phase and adjacent to each other in the circumferential direction are called a first coil 4A and a second coil 4B, respectively. That is, the coil 4 of each phase includes the first coil 4A and the second coil 4B. The first coil 4A and the second coil 4B are any two of the coils 4. In the process of winding each of the conductors 40 of the first coil 4A and the second coil 4B, the conductors 40 are wound in the order of the first coil 4A and the second coil 4B.

The stator 2 includes the jumper wire 43 connecting the end 42 of the conductor 40 constituting the first coil 4A and the end 42 of the conductor 40 constituting the second coil 4B. Here, the axial position of the jumper wire 43 is within a range from the end 401 on the upper side (one side in the axial direction) to the end 402 on the lower side (the other side in the axial direction) of the wound portion 41. That is, the jumper wire 43 extends from the first coil 4A toward the second coil 4B without protruding upward relative to the end 401 on the upper side of the wound portion 41. The jumper wire 43 extends from the first coil 4A toward the second coil 4B without protruding downward relative to the end 402 on the lower side of the wound portion 41.

In the configuration in which the axial position of the jumper wire 43 is within the range from the end 401 on the upper side to end 402 on the lower side of the wound portion 41, it is not necessary to increase the wiring space of the jumper wire 43 in the axial direction. This makes it possible to easily suppress an increase in the axial width of the motor 100.

In the configuration of the modification (see FIG. 5) in which the substrate 300 is arranged below the stator 2, the conductor 40 and the substrate 300 can be suppressed from coming into contact with each other, even without the lower space of the stator 2 is not increased in the axial direction.

Here, the jumper wire 43 connects the start end 421 of one of the first coil 4A and the second coil 4B and the terminal end 422 of the other of the conductors 40 of the first coil 4A and the second coil 4B. Both the axial positions of the start end 421 and the terminal end 422 are within the range from the end 401 on the upper side to end 402 on the lower side of the wound portion 41. This allows the axial position of the jumper wire 43 to easily fall within the range from the end 401 on the upper side to the end 402 on the lower side of the wound portion 41.

The jumper wire 43 is the same member as the conductor 40 constituting the coil 4. In other words, the conductor 40 has, from the beginning, a part to become the jumper wire 43. In still other words, the conductor 40 includes the wound portion 41, the end 42, and a part to become the jumper wire 43.

Due to this, each of the coils 4 of the same phase is configured by the one continuous conductor 40. Therefore, in a case where the conductor 40 to become the first coil 4A is wound first and then the conductor 40 to become the second coil 4B is wound, the jumper wire 43 connects the terminal end 422 of the conductor 40 constituting the first coil 4A and the start end 421 of the conductor 40 constituting the second coil 4B.

As a modification, although not illustrated, the jumper wire 43 may be a member separate from the conductor 40 constituting the coil 4. In this modification, for example, after the first coil 4A and the second coil 4B are formed, the end 42 of the conductor 40 constituting the first coil 4A and the end 42 of the conductor 40 constituting the second coil 4B may be connected by the jumper wire 43.

The example embodiments of the present disclosure have been described above. The scope of the present disclosure is not limited to the above-described example embodiments. The present disclosure can be implemented with various modifications made within a scope not departing from the gist of the present disclosure. The above-described example embodiments and the modifications can be appropriately and optionally combined.

Example embodiments of the present disclosure can be used as a drive source for an aircraft or the like, for example.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a rotor that is rotatable about a central axis; and
a stator radially opposing the rotor; wherein
the stator includes:
a stator core including an annular core back centered on the central axis and teeth extending radially from the core back; and
a coil provided on at least a portion of the stator core;
the coil is defined by an air coil which includes a conductor;
the conductor includes:
a plurality of conductive wires;
an annular wound portion wound around the teeth; and
an end extending from the wound portion;
the end includes multiple conductive wires of the plurality of conductive wires; and
an axial position of the end is within a space extending from an end on one side of the wound portion to an end on another side of the wound portion in an axial direction of the wound portion.

2. The motor according to claim 1, wherein
the coil includes coils corresponding to a plurality of phases;
each phase of the plurality of phases includes a first coil and a second coil;
the stator includes a jumper wire connecting ends of the conductor corresponding to the first coil and the second coil; and
an axial position of the jumper wire is within the range.

3. The motor according to claim 2, wherein
the ends of the conductor include a start end and a terminal end;
the start end extends from an inner side of the wound portion, the inner side being closest to the teeth;
the terminal end extends from an outer side of the wound portion, the outer side being farthest from the teeth; and
the jumper wire connects the start end of one of the conductors of the first coil and the second coil and the terminal end of another of the conductors of the first coil and the second coil.

4. The motor according to claim 3, wherein the terminal end extends from an axial end of the wound portion.

5. The motor according to claim 4, wherein the start end and the terminal end are on a same side in an axial direction with respect to the teeth.

6. The motor according to claim 3, wherein the terminal end extends from a circumferential end of the wound portion.

7. The motor according to claim 1, wherein the wound portion includes:
a lowermost layer portion at a lowermost layer closest to the teeth; and
an upper layer portion on the lowermost layer portion.

8. The motor according to claim 7, wherein
the wound portion includes a plurality of the upper layer portions; and
the plurality of upper layer portions overlap the lowermost layer portion.

9. The motor according to claim 1, wherein
the conductor includes a plurality of the conductive wires arrayed in parallel or substantially in parallel with one another in one direction; and
the wound portion is a portion in which the conductor overlaps in layers in a direction perpendicular or substantially perpendicular to an array direction of the plurality of conductive wires defining the conductor.

10. An aircraft comprising:
the motor according to claim 1; and
a propeller that is rotatable by a driving force of the motor.

11. The motor according to claim 2, wherein the wound portion includes:
a lowermost layer portion at a lowermost layer closest to the teeth; and
an upper layer portion provided on the lowermost layer portion.

12. The motor according to claim 3, wherein the wound portion includes:
a lowermost layer portion at a lowermost layer closest to the teeth; and
an upper layer portion on the lowermost layer portion.

13. The motor according to claim 4, wherein the wound portion includes:
a lowermost layer portion at a lowermost layer closest to the teeth; and
an upper layer portion on the lowermost layer portion.

14. The motor according to claim 5, wherein the wound portion includes:
a lowermost layer portion at a lowermost layer closest to the teeth; and
an upper layer portion on the lowermost layer portion.

15. The motor according to claim 6, wherein the wound portion includes:
a lowermost layer portion at a lowermost layer closest to the teeth; and
an upper layer portion on the lowermost layer portion.

* * * * *